United States Patent
Pastleitner et al.

[11] Patent Number: 6,047,895
[45] Date of Patent: Apr. 11, 2000

[54] MULTIPLE-WAY VALVE

[75] Inventors: Harald Pastleitner; Joachim Strauch, both of Steyr, Austria

[73] Assignee: TCG Unitech Aktiengesellschaft, Kirchdorf/Krems, Austria

[21] Appl. No.: 09/120,310

[22] Filed: Jul. 22, 1998

[30] Foreign Application Priority Data

Jul. 23, 1997 [AT] Austria ................................ 1252/97

[51] Int. Cl.[7] ............................. G05D 23/30; F01P 7/16
[52] U.S. Cl. ..................... 236/34.5; 236/68 R; 251/11
[58] Field of Search ................. 236/34.5, 68 R; 251/11

[56] References Cited

U.S. PATENT DOCUMENTS

| | | | |
|---|---|---|---|
| 2,526,069 | 10/1950 | Douglas | 236/68 R |
| 3,088,672 | 5/1963 | Simpson | 236/34.5 |
| 3,329,340 | 7/1967 | Lipscombe | 236/34.5 |
| 3,442,483 | 5/1969 | Schwartz | 236/68 R |
| 3,643,913 | 2/1972 | McIntosh | 236/68 R |
| 4,032,068 | 6/1977 | Luchtenberg et al. | 236/34.5 |
| 4,627,567 | 12/1986 | Thorn | 236/34.5 |
| 4,948,043 | 8/1990 | Kuze | 236/34.5 |
| 5,676,308 | 10/1997 | Saur | 236/68 R |
| 5,775,270 | 7/1998 | Huemer et al. | 236/68 R |

FOREIGN PATENT DOCUMENTS

| | | |
|---|---|---|
| 2111354 | 9/1972 | Germany . |
| 2943091 | 5/1981 | Germany . |
| 3317454 | 11/1984 | Germany . |
| 4033261 | 4/1992 | Germany . |

*Primary Examiner*—William E. Tapolcai
*Attorney, Agent, or Firm*—Watson Cole Grindle Watson, P.L.L.C.

[57] ABSTRACT

A compact, quiet, electrically actuatable multiple-way valve, in particular for coolant circulation in an internal combustion engine, includes an inlet duct and at least two outlet ducts branching off from a collecting chamber, each outlet duct being respectively closable by a locking part. Each locking part is connected with an electrically triggerable actuating member which includes a temperature-sensitive, electrically heatable extensible material element.

18 Claims, 3 Drawing Sheets

MULTIPLE-WAY VALVE

BACKGROUND OF THE INVENTION

The invention relates to an electrically actuatable multiple-way valve, in particular for coolant circulation of in an internal combustion engine, having an inlet duct and at least two outlet ducts branching off from a collecting chamber, with each outlet duct per se being closable by one locking part and each locking part being connected with an electrically triggerable actuating member.

DESCRIPTION OF THE PRIOR ART

A multiple-way valve with electrically triggerable regulating members and several outlets ducts which can each be closed by a locking member is known from DE 40 33 261 A1. Multiple-way valves are usually actuated via electromagnetic regulating members. In order to exert the required closing and opening forces, the solenoids must be provided with an adequately large size. In the case of inadequate dimensioning, however, the adjusting forces to be exerted are insufficient in order to make the valve well-running again in case of jamming of the valve, e.g., as a result of corrosion after a longer standstill. In addition to the need for additional space, respectively largely dimensioned solenoid valves have the disadvantage that owing to the relatively high acceleration forces the actuation is accompanied by characteristic and disturbing noises which are not acceptable at high switching frequencies and the many paths of flows to be switched.

From DE 33 17 454 A1 a cooling system with a control unit having two thermostatic valves is known by means of which the flow cross section of two control members is controlled independently from one another.

U.S. Pat. No. 4,032,068 describes a thermostatic valve with several temperature-sensitive locking parts. Measures for electronic actuation are not provided.

The specification DE 21 11 354 A covers a swinging gate valve for coolant controllers with a thermostatic working element which is provided with a temperature-sensitive part. Measures for the electric control of the swinging gate valve are not provided.

DE 29 43 091 A1 describes a liquid cooling system for an internal combustion engine with a radiator thermostatic valve which is arranged as a rotary slide valve. The valve is provided with one inlet duct and two outlet ducts which are alternatingly opened and closed by the rotary slide valve. In one embodiment the thermostatic actuating device is provided with a heating spiral around a temperature sensor as an additional control device. The heating spiral is used to heat up the actuating device immediately after the starting process of the internal combustion engine to such an extent that the radiator thermostatic valve is actuated. It is not possible to close off each outlet duct per se by a respective locking part.

U.S. Pat. No. 4,948,043 shows a thermostatic valve with an extensible material element which contains wax as an extensible material. An electric heating is not shown.

SUMMARY OF THE INVENTION

It is the object of the present invention to avoid such disadvantages and to reduce the dimensions and the operational noises in the simplest possible way in a multiple-way valve of the kind mentioned above.

This is achieved in accordance with the invention that each electrically triggerable actuating member is provided with a temperature-sensitive, electrically-heatable extensible material element, with a cooling device preferably being provided in the zone of the extensible material element. As a result of the electric heating of the extensible material element there will be an increase of volume of the extensible material. The volume changing forces act thereby on the locking part which is preferably arranged as a rotary slide valve. It is preferably provided that the closed position of the locking part correlates with the cooled state of the extensible material element and the opened position of the locking part with the heated state of the extensible material element. This leads to the advantage that under the prerequisite of a respective dimensioning of the heating element of the actuating member a relatively rapid opening of the locking part can be effected. The closing movement of the locking part on the other hand is determined by the cooling speed of the extensible material which is generally lower than the heating speed. This benefits the requirements for the use in cooling systems in refrigerating machines in order to be able to rapidly supply the coolant in a purposeful manner and when it is needed to the parts of the machine to be cooled such as the cylinder head, the motor unit, oil heat exchanger, the turbocharger, etc. Preferably, each actuating member is in connection with an electric control device which by way of sensors determines the part to be cooled and initiates the cooling of the respective component by current supply to the heating element of the actuating member for the respective outlet duct to be triggered. In the case of sufficient cooling of the component the current supply is interrupted again, as a result of which the locking part returns relatively slowly to its closed position again in accordance with the cooling speed of the extensible material.

The closing speed is further increased by the cooling device provided in the zone of the extensible material elements.

For the purpose of further supporting the closing movement it is provided in accordance with a further, particularly preferable embodiment of the invention that the actuating member is provided with a longitudinally displaceable actuating piston which is connected with the extensible material element and is operatively connected with the locking part, with the actuating piston bordering the collecting chamber by way of a diaphragm. In this way the resetting of the extensible material element is further supported by the pressure of the coolant.

It may optionally further be provided that the actuating member is provided with a spring which supports the closing movement.

In order to save components it may be provided that the rotary slide valves are rotatably arranged on a common axle.

An embodiment in accordance with the invention is particularly preferable in which at least two outlet ducts have different diameters. In this way the coolant quantity can be adjusted to the components to be cooled respectively. Although any desired number of outlet ducts would be possible, embodiments have proved to be reliable in practical operation in which there are arranged between three and seven, preferably five outlet ducts.

Very simple manufacturing is possible if the collecting chamber is substantially provided with a cylindrical, cylinder-segment-like or prismatic shape. Favourably, the inlet duct is arranged on a face side of the collecting chamber. The inlet duct can follow directly after the outlet of a coolant pump. It is also very advantageous to arrange the coolant pump and the multiple-way valve in one unit. In order to use up as little constructional space as possible, it is further advantageous if the outlet ducts, which are preferably in a row, are arranged in the jacket zone of the collecting chamber.

BRIEF DESCRIPTION OF THE DRAWINGS

The invention is now explained in closer detail by reference to the enclosed drawings, wherein.

DESCRIPTION OF THE PREFERRED EMBODIMENTS

Figure 1:
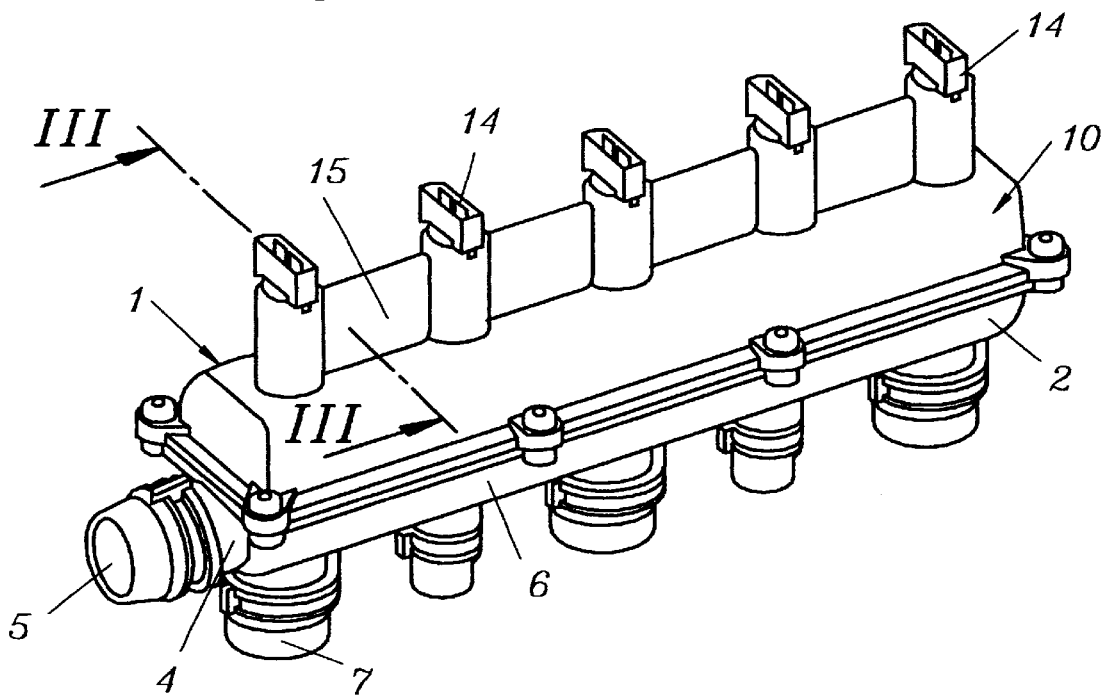
FIG. 1 shows an oblique view of the multiple-way valve in accordance with the invention.
Figure 2:
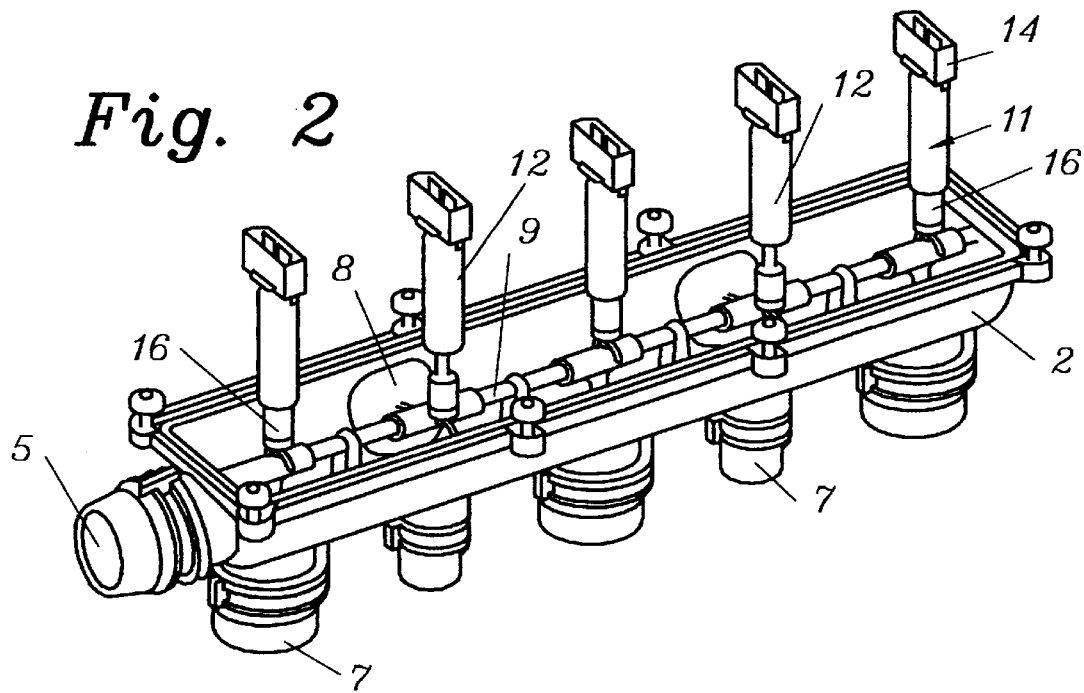
FIG. 2 shows an oblique view of the multiple-way valve with a removed housing part.

The multiple-way valve 1 is provided in a housing 2 with a collecting chamber 3 into which an inlet duct 5 opens in a face side 4. In the zone of the jacket 6 of the collecting chamber 3, which is in the shape of a cylinder segment in this example, five outlet ducts 7 with partly different cross sections are arranged. A locking part 8 is provided for each outlet duct 7, with each locking part being arranged as a rotary slide valve and being rotatable per se about an axle 9 which is common for all locking parts 8, as is shown in FIGS. 2 and 3.

One actuating member 11 is provided for each locking part 8 in an actuating part 10 of the multiple-way valve 1, which actuating part is provided with an extensible material element 12 whose extensible material, preferably consisting of wax, can be heated by an electric heating element 13. The current supply to the heating element 13 is made through a socket 14. In the zone of the extensible material element 12 the actuating member 11 is provided with a cooling device 15 which consists of air- or liquid-cooled cooling surfaces. The extensible material element 12 is connected via an actuating piston 16 with a lever arm 17 of the locking part 8 which is arranged as a rotary slide valve. The extensible material element 12 is separated from the collecting chamber 3 in a liquid-tight manner by a diaphragm 18 which is penetrated by the actuating piston 16.

Figure 3:
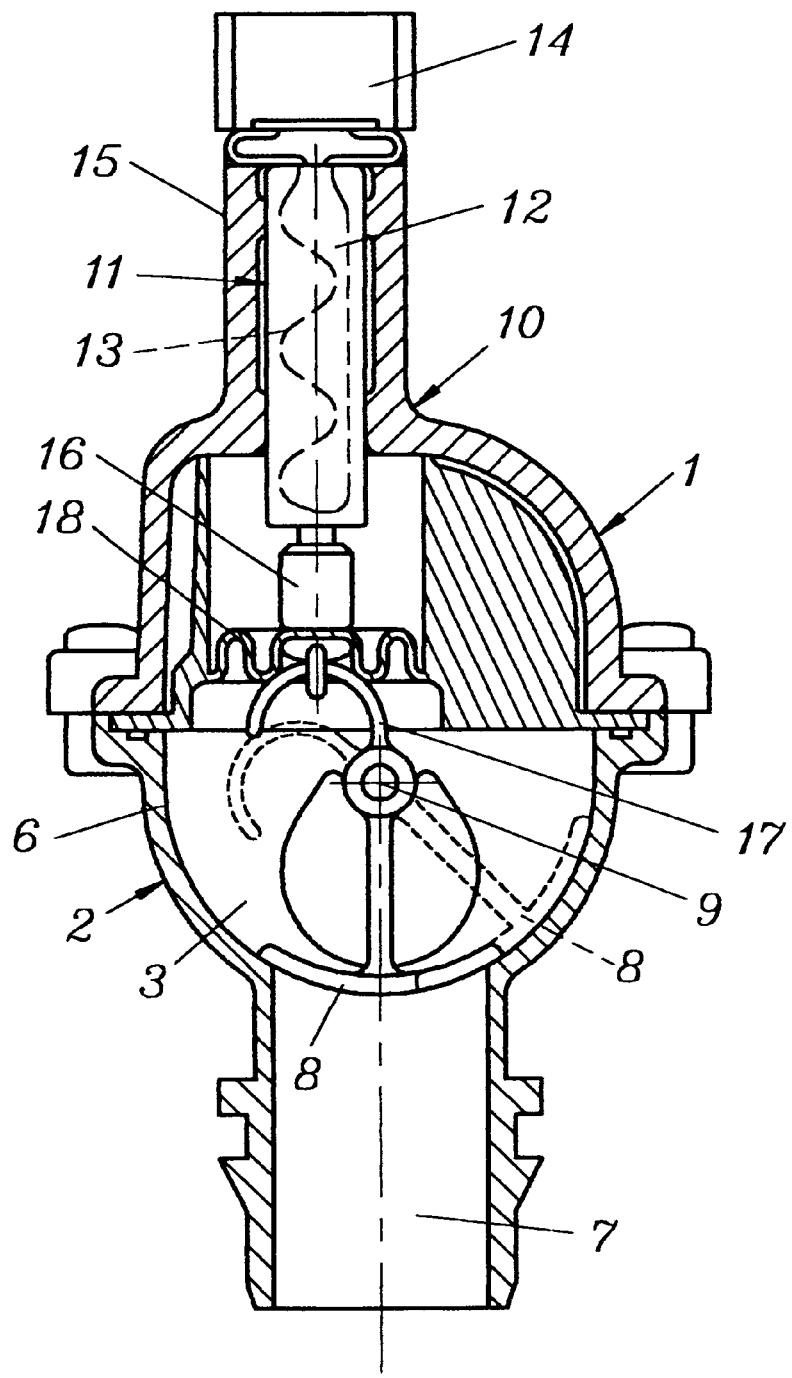
FIG. 3 shows a cross section pursuant to the line III—III in FIG. 1.

In the idle position in which the heating element 13 is currentless, the locking part 8 is in the closed position which is shown in FIG. 3 with the unbroken lines. Once the electric heating element 13 is charged with current, an increase in the volume of the extensible material of the extensible material element 12 occurs, as a result of which the actuating piston 16 is pressed away from the extensible material element 12 and the locking part 8 is rotated into the opened position which is indicated in FIG. 3 by the broken lines. Thus, the flow connection between the inlet duct 5 and the triggered outlet duct 7 is released. Intermediate positions are also possible, as the deflecting movement of the actuating piston 16 depends on the amount of the change in volume of the extensible material and the latter again depends on the supplied heat quantity. In this way the position of the locking part 8 can be controlled relatively easily by the amount of the supplied electric power.

The closing movement of the locking part 8 is initiated by the cooling of the extensible material in the extensible material element which can be effected by interrupting or reducing the current and/or by increasing the cooling output of the cooling device 15 for the extensible material element 12. This leads to a reduction in the volume of the extensible material and to the return movement of the actuating piston 16 to the idle position. The resetting of the actuating piston 16 is supported by the pressure of the coolant bordering the diaphragm 18. If this is insufficient, a return springs may be additionally provided for the actuating piston 16.

Figure 4:
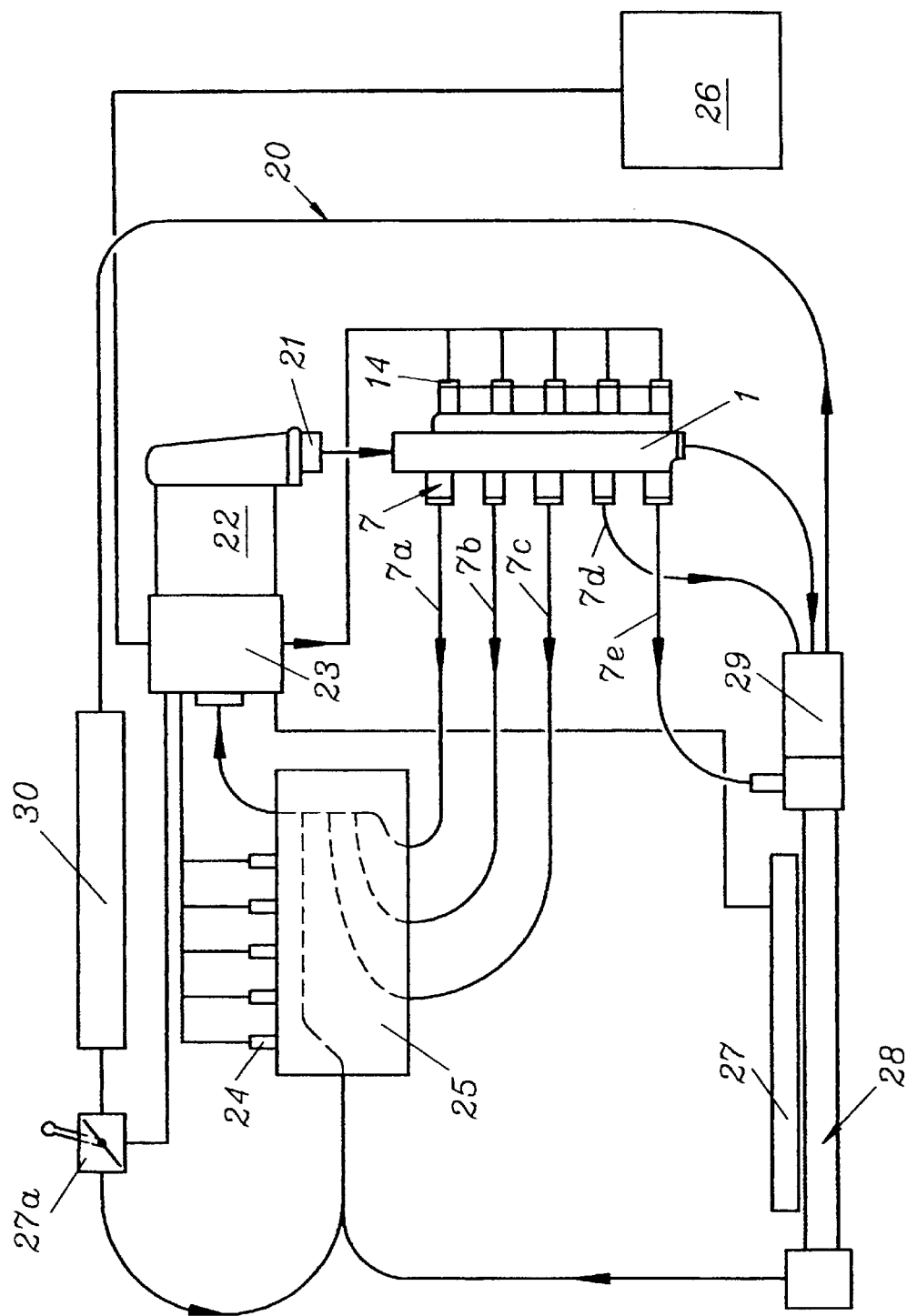
FIG. 4 shows a block diagram of a coolant circulation of an internal combustion engine with the multiple-way valve in accordance with the invention.

FIG. 4 shows an embodiment for the multiple-way valve 1 in accordance with the invention in the coolant circulation 20 of an internal combustion engine 25. The inlet duct 5 of the multiple-way valve 1 is connected to the outlet 21 of an electric water pump 22. The current supply to the sockets 14 of the actuating part 10 of the multiple-way valve 1 is performed by way of an electric pump control unit 23 which receives the values of the temperature sensors 24 in the internal combustion engine 25 as input value. The control unit 23 is further connected with an engine control unit 26, heat quantity regulator 27a and the fan 27 of the radiator 28. The reference numeral 30 indicates the vehicle heating.

The outlet ducts 7 are connected with a line 7a leading to the cylinder head, a line 7b leading to the oil cooler and, optionally, further lines 7c to the turbocharger and/or to the charge cooler or the like. A further line 7d leads to the compensator reservoir 29 of the coolant and a line 7e leads to radiator 28. In this way it is possible to individually trigger each component to be cooled by the pump control unit 23 and the coolant quantity to be discharged can be adjusted optimally to the respective requirements.

We claim:

1. An electrically actuatable multiple-way valve, in particular for a coolant circulation of an internal combustion engine, comprising:

an inlet duct and at least two outlet ducts branching off from a collecting chamber, with each outlet duct per se being closable by a locking part and each locking part being connected with an electrically triggerable actuating member, wherein each electrically triggerable actuating member comprises a temperature-sensitive, electrically heatable extensible material element, with a cooling device being provided in the zone of the extensible material elements.

2. A multiple-way valve according to claim 1, wherein the locking part is formed by a rotary slide valve.

3. A multiple-way valve as according to claim 1, wherein the heat-sensitive extensible material of the extensible material element consists of wax or a wax-like material.

4. A multiple-way valve according to claim 1, wherein the closed position of the locking part correlates with the cooled state of the extensible material element and the opened position of the locking part correlates with the heated state of the extensible material element.

5. A multiple-way valve according to claim 1, wherein the actuating member is provided with a spring supporting the closing movement.

6. A multiple-way valve according to claim 1, wherein the actuating member is provided with a longitudinally displaceable actuating piston which is connected with the extensible material element and is operatively connected with the locking part, with the actuating piston bordering the collecting chamber by way of a diaphragm.

7. A multiple-way valve according to claim 2, wherein the rotary slide valves are rotatably arranged on a common axle.

8. A multiple-way valve according to claim 1, wherein at least two outlet ducts have a different diameter.

9. A multiple-way valve according to claim 1, wherein three to seven outlet ducts are provided.

10. A multiple-way valve according to claim 1, wherein five outlet ducts are provided.

11. A multiple-way valve according to claim 1, wherein the collecting chamber has a cylindrical shape.

12. A multiple-way valve according to claim 1, wherein the collecting chamber has a cylinder-segment-like shape.

13. A multiple-way valve according to claim 1, wherein the collecting chamber has a prismatic shape.

14. A multiple-way valve according to claim 1, wherein the inlet duct is arranged on a face side of the collecting chamber.

15. A multiple-way valve according to claim 1, wherein the outlet ducts are arranged in a jacket zone of the collecting chamber.

16. A multiple-way valve according to claim 15, wherein the outlet ducts are in a row.

17. A multiple-way valve according to claim 1, wherein the actuating members are connected with an electronic control device.

18. A multiple-way valve according to claim 1, wherein said valve includes an elongated housing defined by a jacket and a cooperating actuating part, wherein said electrically triggerable actuating members are aligned and extend from said actuating part in a direction away from said jacket, and wherein said cooling device extends between said actuating members and provides surfaces which can be cooled by air or liquid.

* * * * *